(12) United States Patent
Al Wehebi

(10) Patent No.: US 8,091,420 B2
(45) Date of Patent: Jan. 10, 2012

(54) ILLUMINATED DIRECTIONAL WIND SPEED INDICATOR

(75) Inventor: Fahad Abdullah Mohammed Al Wehebi, Yanbu (SA)

(73) Assignee: Saudi Arabian Oil Company, Dhahran (SA)

( * ) Notice: Subject to any disclaimer, the term of this patent is extended or adjusted under 35 U.S.C. 154(b) by 134 days.

(21) Appl. No.: 12/661,546

(22) Filed: Mar. 17, 2010

(65) Prior Publication Data

US 2011/0226051 A1 Sep. 22, 2011

(51) Int. Cl.
*G01W 1/00* (2006.01)

(52) U.S. Cl. .................. 73/170.01; 73/170.06

(58) Field of Classification Search .................. None
See application file for complete search history.

(56) References Cited

U.S. PATENT DOCUMENTS

| 379,031 | A | 3/1888 | Rockwell |
| 1,342,860 | A | 6/1920 | Mortimer |
| 1,879,267 | A | 9/1932 | Hurni |
| 1,911,169 | A | 5/1933 | Trogner |
| 1,953,159 | A | 4/1934 | Eskilson |
| 1,969,206 | A | 8/1934 | Castendijk |
| 2,040,305 | A | 5/1936 | Graham |
| 3,404,566 | A | 10/1968 | Cordova |
| 3,691,829 | A | 9/1972 | Perry |
| 4,107,989 | A | 8/1978 | Peters |
| 4,201,973 | A | 5/1980 | Jackson |
| 4,204,271 | A | * | 5/1980 | Braly ........................ 362/145 |
| 4,241,604 | A | 12/1980 | Hergenrother |
| 4,481,505 | A | * | 11/1984 | Thompson .................. 340/601 |
| 4,812,844 | A | 3/1989 | Kallstrom |
| 4,850,798 | A | * | 7/1989 | Bailey ........................ 416/11 |
| 5,117,690 | A | 6/1992 | Baer |
| 5,323,649 | A | 6/1994 | Carlson |
| 5,469,738 | A | 11/1995 | Hendrickson |
| 6,046,679 | A | 4/2000 | Cosyns |
| 7,046,160 | B2 | 5/2006 | Pederson |
| 7,310,047 | B2 | 12/2007 | Al-Wehebi |

OTHER PUBLICATIONS

Federal Aviation Administration, Advisory Circular, AC No. 150/5345-27D (Jun. 2, 2004).
Search Report and Written Opinion in Coresponding PCT Application, PCT/US2011/026419, mailed Apr. 26, 2011.

* cited by examiner

*Primary Examiner* — Andre Allen
(74) *Attorney, Agent, or Firm* — Abelman, Frayne & Schwab

(57) ABSTRACT

A combination wind direction and wind speed indicating apparatus for providing enhanced visibility at night and under other low visibility conditions is mounted, for example, at an airport landing zone, to rotate in the wind and indicates wind direction with high-intensity colored lights mounted in a specified array about the horizontal periphery of the apparatus; a vertical array of lights is illuminated in response to incremental wind speed variations. The apparatus can include a self-contained source of electrical power such as a rechargeable battery pack connected via appropriate circuitry to a solar power cell.

14 Claims, 7 Drawing Sheets

ILLUMINATED DIRECTIONAL WIND SPEED INDICATOR

BACKGROUND OF THE INVENTION

1. Field of the Invention

This invention relates to a wind direction and speed indicator, and in particular, to an improved apparatus design that provides greater visibility of the indicator at night and during other low visibility conditions.

2. Description of the Related Art

Airplane pilots who are approaching an airport or landing strip need to know the ground wind direction and relative speed in order to safely land their craft. A number of devices are in use, or have been proposed to assist aviators by indicating wind direction and speed.

Since antiquity, wind vanes have been used for indicating wind direction and some airports continue to use wind vanes for this purpose. For example, the Whitehorse International Airport in Yukon Territory, Canada, has mounted a retired commercial aircraft, a Douglas DC-3, to serve as a wind vane for the airport. Relative wind speed can be indicated with an anemometer, which is believed to have been invented during the Renaissance by Leon Battista Alberti, when he suspended a flat plate from an edge and discovered that the wind would deflect the plate, with the revolutions depending on the wind speed. The anemometer has been updated in more recent times as a cup anemometer, in which the plate is replaced by three or four cups attached by arms to a vertical rod that catch the wind to rotate the rod.

A wind vane and cup anemometer are sometimes positioned on the same vertical rod. Alternatively, another combination of wind vane and anemometer is the aerovane, in which a propeller and a tail are combined on the same horizontal shaft and mounted on a vertical axis for rotation to indicate wind direction.

Perhaps the simplest device for indicating wind direction and relative speed is a windsock, a piece of cloth with a frustoconical shape provided with a rigid circular support for the wider end and mounted for rotation on a vertical shaft. In low winds, the cloth droops, but in higher winds the cloth fills and flies horizontally, indicating the direction in which the wind is blowing. For example, if the windsock is pointing east, that means there is a westerly wind (a wind blowing from west to east). The windsock's angle relative to the ground provides an indication of whether the winds are light, moderate or heavy. Windsocks may be affected by sleet, snow and freezing weather in both their ability to rotate into the wind and also to straighten or extend from a vertical to a horizontal position.

The United States Federal Aviation Authority (FAA) Specification for Wind Cone Assemblies, FAA Advisory Circular 150/5345-27D, requires windsocks to indicate wind direction in winds as light as 3 knots, and to be fully extended in the horizontal position (indicating high winds) at 15 knots. Windsocks may be lighted for nighttime observation, either by floodlights illuminating the exterior of the windsock, or with a pole-mounted light illuminating the windsock's interior.

U.S. Pat. No. 1,879,267, "Wind Indicator for Aviators," discloses an aerovane in which the casing of the device has a triangular shape with a rudder at the point to steer the aerovane. The casing also contains lamps to provide illumination of the aerovane at night. However, the propeller at the front of the aerovane which provides relative wind speed information is not illuminated. Aviators would therefore have a difficult time gauging wind speed at night.

U.S. Pat. No. 1,911,169, "Air Navigation Apparatus," discloses a tubular member through which wind passes, as though it were a rigid version of a windsock. The tubular member pivots to indicate the wind direction. Some of the wind passing through the tubular member is diverted and operates a spring and gear mechanism, which controls a pointer that indicates relative wind speed on a large dial mounted on the top of the tubular member. The spring and gear mechanism complicate this device, and the distance at which the dial may be read is not great. In addition, the apparatus is not illuminated for nighttime use.

U.S. Pat. No. 1,953,159, "Means for Indicating the Direction and Velocity of the Wind Near the Ground," discloses a wind vane with two arms that pivot at different wind speeds, so that a pilot may observe the orientation of the wind vane and the angle of the pivoting arms and determine the wind direction and relative speed. Lights on the vane and arms illuminate for nighttime observation. The design is complicated because of the need to control the pivoting arms.

U.S. Pat. No. 1,969,206, "Device for Giving Luminous Signals, Particularly Adapted for Aviation Purposes," discloses a wind vane with a projection lamp system that projects the wind direction and speed onto a reflective screen or other surface. This design requires a projection surface, and the reflection of the projected light will not be as visible at a distance as direct illumination would be, especially if the surface were dirty or coated with ice or snow.

U.S. Pat. No. 4,241,604, "Nighttime Wind Direction and Speed Indicator," discloses a lamp with a rotatable projection lens that concentrates a portion of the light from the lamp and projects it on the nearby ground. The rotatable projection lens is attached to an external wind vane, so that the lens rotates as the wind vane pivots in the wind, with the projected beam indicating wind direction. A cup anemometer on top of the housing is connected to a rotatable shutter internal to the lamp so that the shutter interrupts the projected beam of light, with the frequency of interruption being proportional to the wind speed. It is not clear how an aviator not familiar with the device would relate the flashing to the ground speed of the wind.

U.S. Pat. No. 5,323,649, "Airport Wind Direction and Velocity Indicator," discloses a housing shaped as a tetrahedron with a triangular cross section that pivots in the wind. The edges of the housing are illuminated, allowing pilots to view the wind direction from a distance at night. In addition, a cup anemometer mounted on the housing measures wind speed, which is projected as large illuminated numerals mounted on the two top sides of the housing.

U.S. Pat. No. 7,310,047, "Gas Alarm System with Wind Direction Indicator," discloses a mechanism that senses the presence of a hazardous gas and provides annunciation to signal and warn personnel of the hazardous gases and to also alert them as to the direction of the wind carrying the toxic gas.

The devices of the prior art have limited ability for use in regions that may experience conditions of blowing sand and dust at ground level due to complex mechanical systems that could become fouled and that would require frequent inspection and maintenance to assure their continued reliable operation.

Apparatus that display numbers also present problems of deciphering the numerals at a distance as the pilot is approaching the runway or landing strip.

It is therefore an object of the present invention to provide an improved wind speed and direction indicator that is highly visible and readily discernable to the pilot or navigator of an approaching aircraft, particularly under conditions of lowered visibility.

Another object of the invention is to provide such a wind speed and direction indicator that is of robust and durable construction having low maintenance requirements that will remain operable under harsh conditions including, for example, ice, snow, airborne dust and/or sand, and that can be installed at remote airstrips.

SUMMARY OF THE INVENTION

The above objects and other advantages are achieved by the present invention which comprehends an improved wind direction and wind speed indicator that provides for greater visibility of both of indications at night and under other conditions of poor visibility.

The wind direction indicator portion of the present invention includes: (a) a mast-mounted rotatable central body member; (b) a rudder or windvane attached to the body member; and (c) lights mounted on the edge of the central body and on the sides of the rudder.

In a preferred embodiment, the rotatable body member is shaped as a generally circular disk. However, other shapes can be utilized, such as an elliptical disk, an elongated member, or a conical or frustoconical structure.

In a preferred embodiment, the rudder is arrow-shaped for ease of identification of its orientation and is attached to the central body by a projecting cantilever mounting assembly displaced from the vertical axis of rotation in order to assure rotational movement of the apparatus in light winds or in the event that the free movement of the rotational bearings are affected by adverse weather conditions, e.g., the accumulation of dirt, ice or the like. However, a variety of planar or other rudder shapes can be used that present sufficient area to wind currents to assure movement of the body assembly. Other known wind vane mounting methods and structures can be used, e.g., the rudder can be attached directly to the central body, or can be an integral part of the central body.

Any of various types of lights can be used in the present invention, including, for example, incandescent, fluorescent, xenon, argon, halogen, high intensity discharge (HID), optical cables and gel cables. For convenience and the purpose of describing a preferred embodiment, reference will be made to light-emitting diodes (LEDs).

In a preferred embodiment, the anemometer portion of the invention takes the form of a wind activated airfoil or paddle and lever assembly linked electromechanically to an associated vertically arrayed light display to indicate wind speed.

In another preferred embodiment, the combined wind direction and speed indicator of the invention is provided with solar panels and one or more rechargeable batteries to provide power for operation and allow the device to be installed in remote areas where an electric power source is limited, unreliable or not available. In this embodiment, operating on battery power, LEDs are especially preferred due to their high efficiency, i.e. high lumen output with relatively lower power consumption.

The present invention also has the advantage of extended life as compared to natural or synthetic fabric-type windsocks, while the LEDs of the preferred embodiment allow the device to be seen at a greater distance than a pilot can view a traditional windsock. The apparatus and its components can be constructed of a scale and positioned at a location relative to the landing zone to accommodate the specific type of aircraft that typically utilize the runway. A landing strip or field serving small craft can utilize a device that is smaller in scale than may be desirable for guiding larger aircraft.

The present invention can also be utilized to provide a highly visible wind direction indicator to workers evacuating an industrial chemical production facility during an emergency such as a release of hazardous gas, when it would be important to know the prevailing wind direction in order to select the safest evacuation route.

BRIEF DESCRIPTION OF THE DRAWINGS

The present invention will be further described in detail below and with reference to the attached drawings which are provided by way of illustration and example only, and in which.

DETAILED DESCRIPTION OF THE INVENTION

Figure 1:
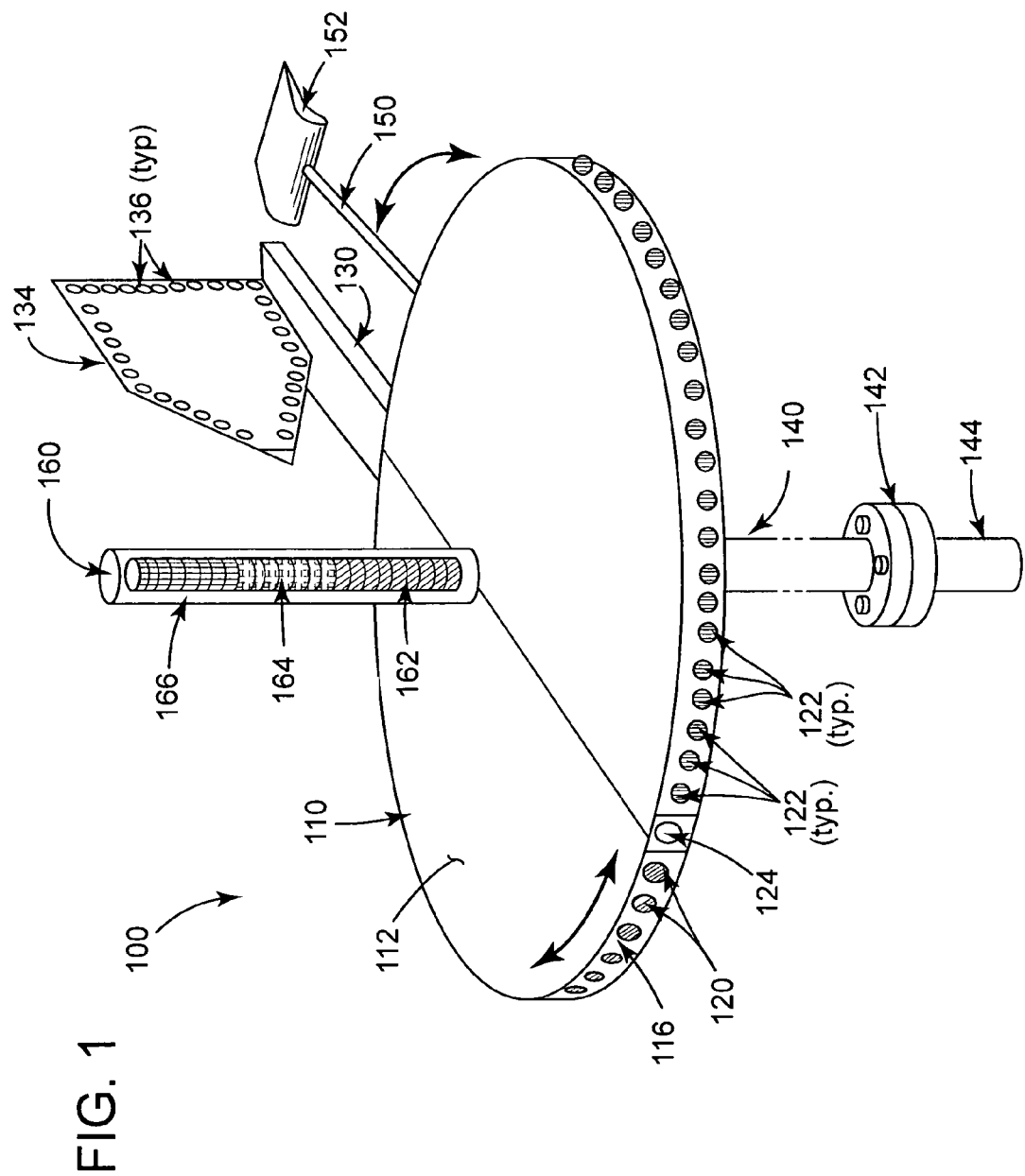
FIG. 1 is a top, front perspective view of one embodiment of the illuminated directional wind speed indicator of the invention having a generally circular central body.
Figure 2:
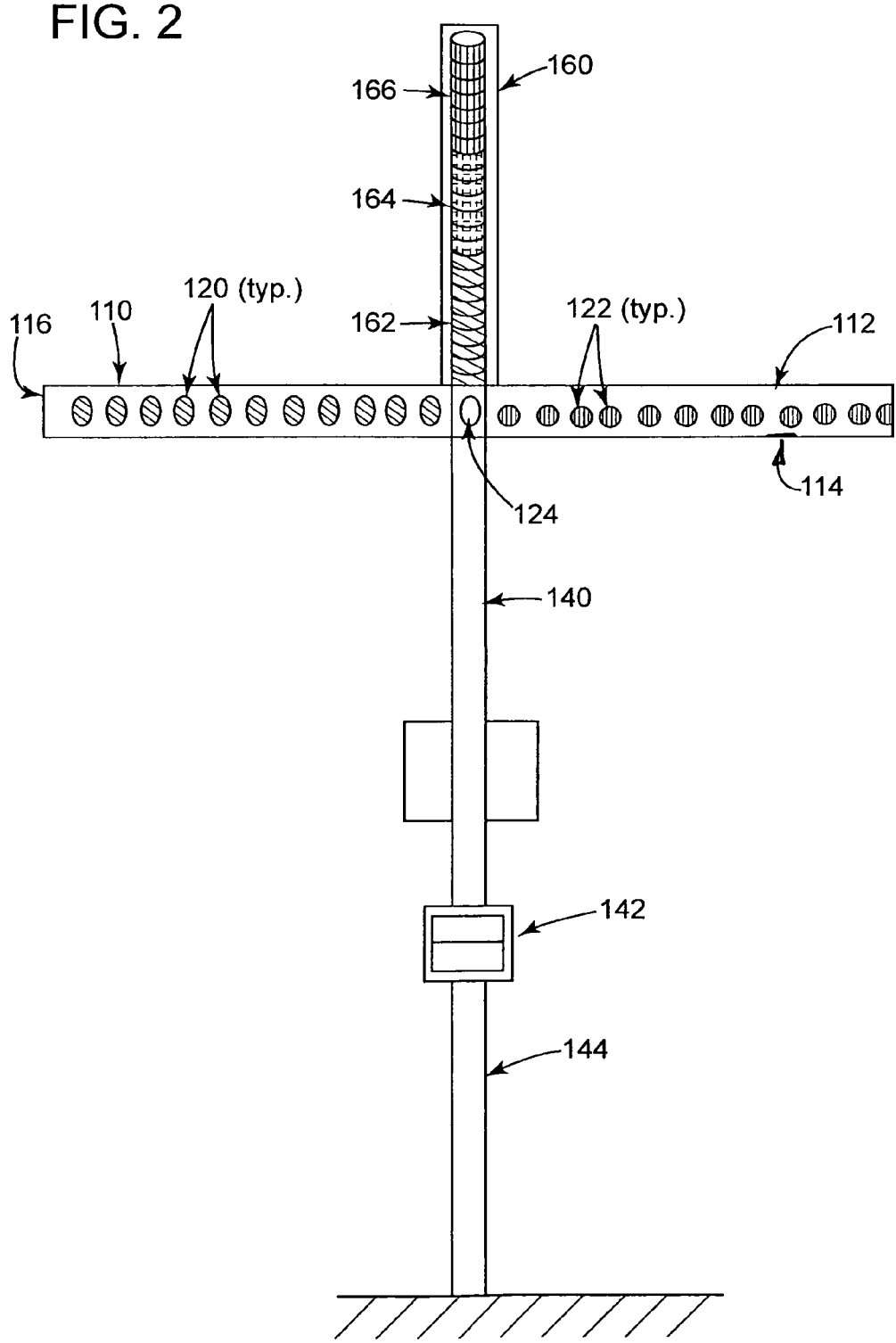
FIG. 2 is a front elevation view of FIG. 1.

Referring to FIGS. 1 and 2, the illuminated directional wind speed indicator 100 includes a rotationally-mounted base member in the form of a rotatable enclosure 110 with top surface 112, bottom surface 114 (not shown) and side 116. In the embodiment shown in FIGS. 1 and 2, the rotatable enclosure 110 is shaped as a disk or short cylinder of generally circular cross-section. As will be apparent from this description, other non-circular configurations can be employed for the base member.

Figure 3:
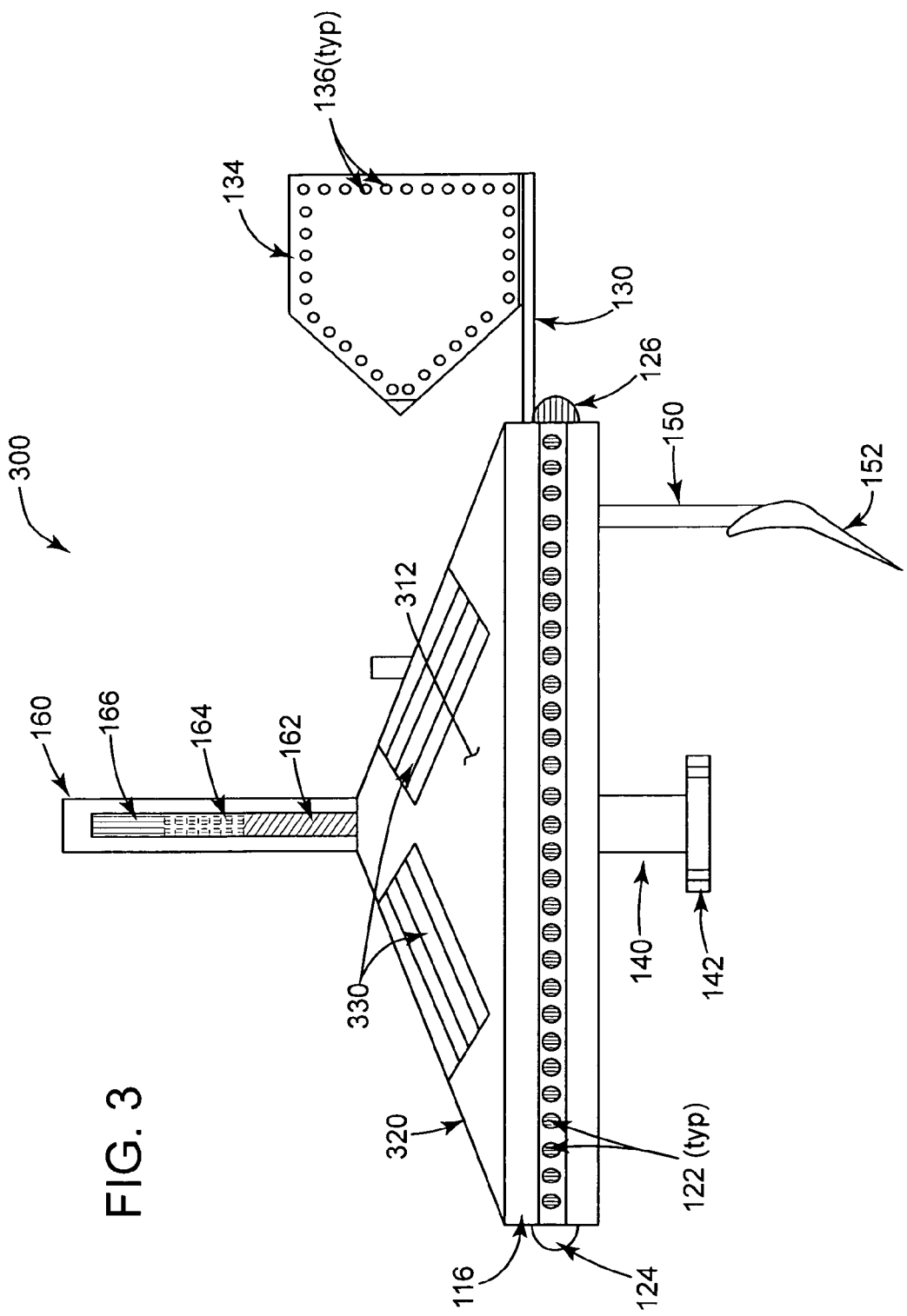
FIG. 3 is a side elevation view of another embodiment of the illuminated directional wind speed indicator having a cone-shaped central body.

A plurality of high intensity light-emitting diodes (LEDs) of predetermined and readily distinguishable colors are mounted along the periphery or the side of the rotatable enclosure 110. For example, the right side can be fitted with an array of green LEDs 120 arranged with equal angular spacing and the left side provided with an array of red LEDs 122. The rotatable enclosure 110 has a forward central portion on which is mounted one or more white LEDs 124 and an aft or rear central portion on which is mounted one or more blue LEDs 126, as best shown in FIG. 3. Other distinctive and readily distinguishable color combinations can be employed.

A projecting arm or beam 130 fitted with an arrow-shaped planar rudder or windvane 134 is mounted at the rear central position of the rotatable enclosure 110. The rudder 134 has a left side and a right side, on each of which is mounted a red LED rudder array 136. As will be apparent to one of ordinary skill in the art, the rudder and beam can be produced as a single assembly, for example, by a molding or casting process. Furthermore, the base member 110, rudder 134 and its supporting beam 130 can also be produced as a unitary element.

The rotatable enclosure 110 is bearing-mounted at its center of rotation on a supporting post 140, which terminates in a coupling 142. The coupling 142 in turn bolts to a vertical post 144 which is permanently secured in the ground, such as by embedding it in concrete. In one embodiment, the coupling 142 is constructed to provide freedom of rotation and also to house the power link. As an added safety feature, the coupling 142 can also be configured to break away in the event that an aircraft or ground vehicle were to strike the indicator 100.

Also mounted towards the rear and extending away from the central position of the rotatable enclosure 110 below the rudder 134 is an anemometer in the form of a lever assembly 150 which is attached to an airfoil or paddle 152. Mounted on, and extending above the top center of the rotatable enclosure 110 is a vertical bar 160, which carries an array of three stages or groups of wind speed indicator lights. In one embodiment, vertical bar 160 can be transparent, with lights mounted inside. The lowest stage or array of lights 162 are, for example, green, the middle stage of lights 164 are yellow, and the upper stage of lights 166 are red. In a preferred embodiment, switches and lighting circuits are housed in the rotatable enclosure 110.

The rotatable enclosure 110 rotates as wind strikes the rudder 134, so that the rudder 134 indicates the wind direction. During the day, an aviator is able to directly observe the rotatable enclosure 110 and rudder 134 and thus discern the wind direction. At night, a photocell or time clock activates the lighting circuits, which illuminate the rudder array 136 on the rudder 134, as well as the red LEDs 122, green LEDs 116, white LED 124 and blue LED 126 on the rotatable enclosure 110. These illuminate the outline of the rotatable enclosure 110 and rudder 134, allowing a pilot or persons evacuating an area where hazardous gas is present to determine the prevailing wind direction. Thus, if the white light or lights are flanked by one or more red and green lights, the observer will know that the wind is coming from the general direction of the observer. The relative number of red versus green lights provides the trained observer with more specific information about wind direction.

Similarly, the presence of the blue light, or lights flanked by red or green lights, or both red and green lights, indicates that the observer is heading into the wind. If only the array of red or green lights is visible, the observer will understand that a cross wind will be experienced in the vicinity of the indicator.

The intensity or speed of the wind causes the airfoil 152 and its lever 150 to rotate in the vertical plane, with linkage internal to the rotatable enclosure 110 activating switches that measure and process the relative rotation of the airfoil 152. In low wind conditions, there is little or no movement of the airfoil 152 and lever 150, and the circuitry transmits power to the green (lowest) stage of lights 162 of the vertical bar 160. In moderate winds, vertical movement of the airfoil 152 and lever 150 is greater, and the circuitry powers the yellow (middle) stage of lights 164. In the highest winds, the rotational movement of the airfoil 152 and lever 150 is even greater, rotating to its maximum 90 degree position, which is the horizontal position shown in FIG. 1, and the circuitry powers the red (upper) stage of lights 166.

Figure 4:
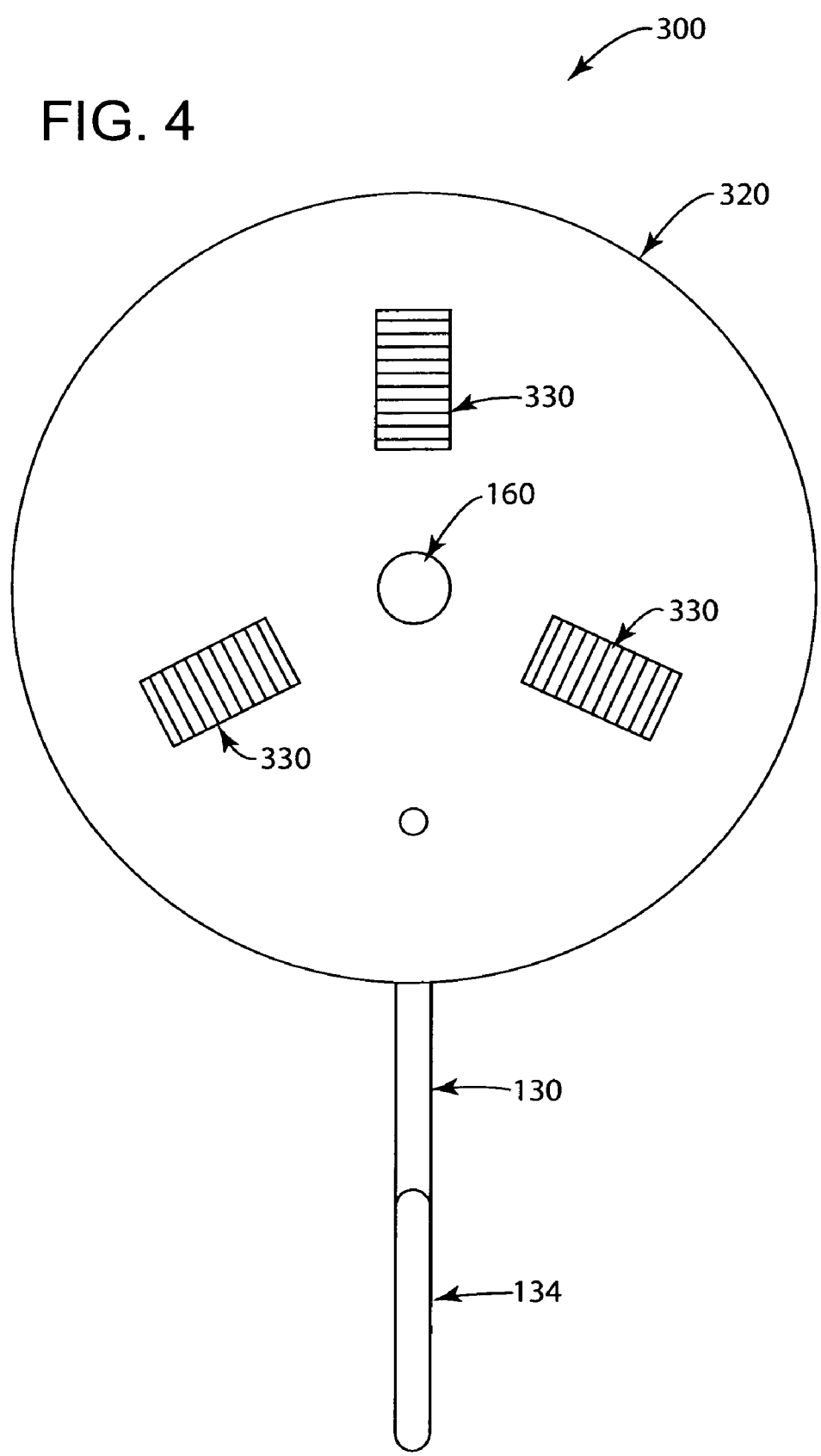
FIG. 4 is a top view of the embodiment of FIG. 3.

Referring now to the embodiment of FIGS. 3 and 4, LED wind direction and speed indicator 300 illustrates a rotatable enclosure 320 of frustoconical shape, with photovoltaic arrays 330 mounted to the angled top surface 312. As with the generally cylindrical rotatable enclosure 110 of FIGS. 1 and 2, the frustoconical rotatable enclosure 320 of FIG. 3 houses a linkage to the airfoil 152 and its lever 150, which activates switches that correspond to, and process the relative rotational position of the airfoil 152, which is shown in FIG. 3 in a vertical, no-wind or not measurable wind position. In addition, rotatable enclosure 320 contains charging circuits and batteries associated with the photovoltaic arrays 330. In other aspects, LED wind direction and speed indicator 300 is similar to the planar embodiment shown in FIGS. 1 & 2 and described above.

Figure 5:
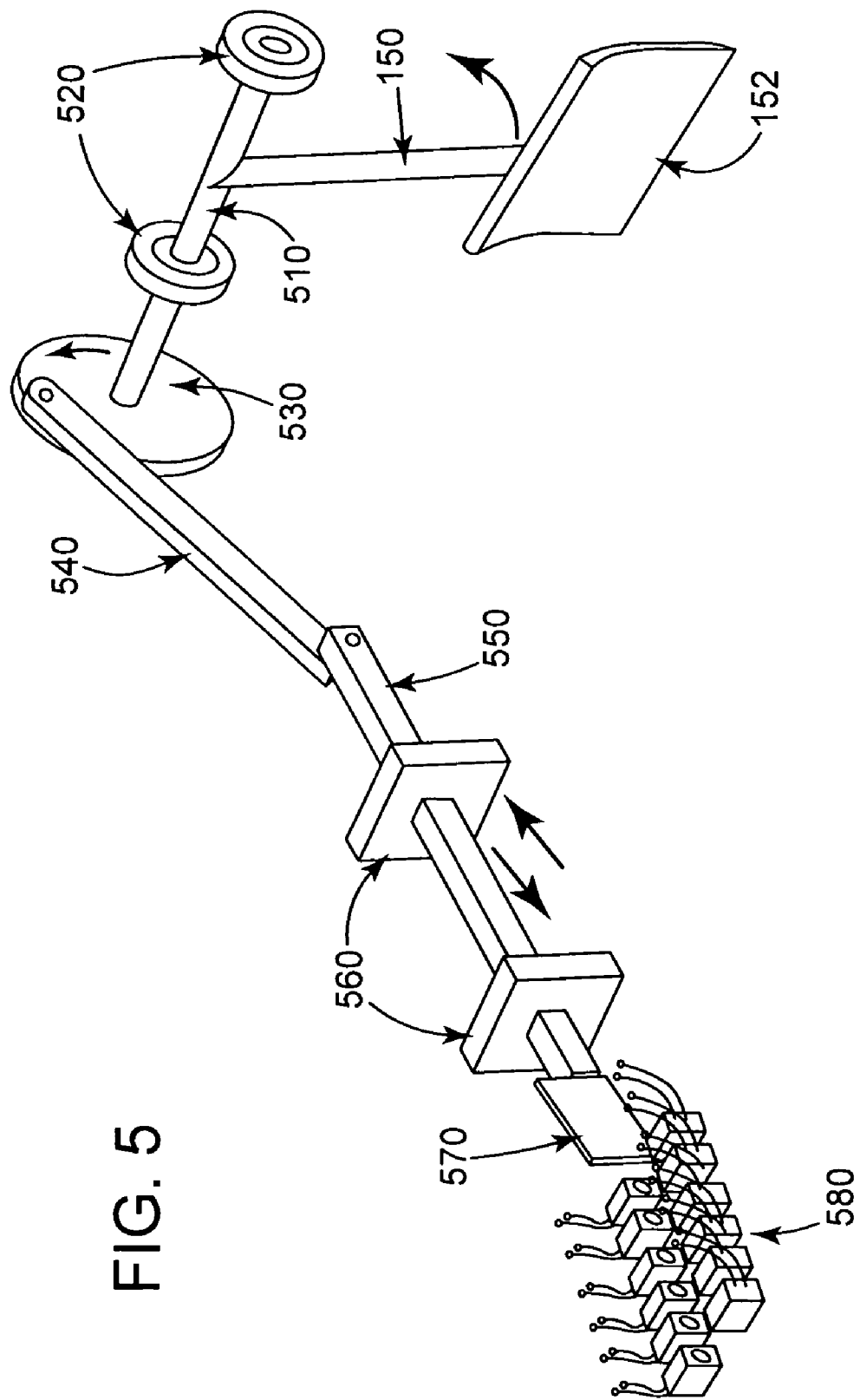
FIG. 5 is a perspective view of one embodiment illustrating an interconnection between the airfoil and the switches that control the lights of the wind speed indicator.

Referring to FIG. 5, one embodiment of an interconnection between the airfoil 152 and the switches 580 that control the lights 162, 164, 166 of the illuminated directional wind speed indicator is illustrated. The airfoil 152 and lever 150 protrude from the housing of the LED wind direction and speed indicator (not shown). The lever 150 connects to a linking/supporting rod 510, which is supported within the housing by fixed bearings 520. As the airfoil 152 is lifted by the wind, the airfoil 152, lever 150, linking/supporting rod 510, and a disc 530 on one end of the linking/supporting rod 510 rotate. The rotation is limited to 90 degrees, and as the disc 530 rotates, an angular/linear converter link 540 attached between disc 530 and shaft 550 converts the circular motion of disc 530 into a linear motion for shaft 550. Shaft 550 then slides linearly through fixed guides 560. In the embodiment shown in FIG. 5, a screen 570 is mounted on the distal end of shaft 550. The screen 570 interrupts optical signals transmitted and received between the optical electronic switch array 580. The activation of particular switches within optical electronic switch array 580 is predetermined and calibrated to correspond to the wind speed of the lifting airfoil 152, and the switch signals are used to control lights 162, 164 and 166.

Figure 6:
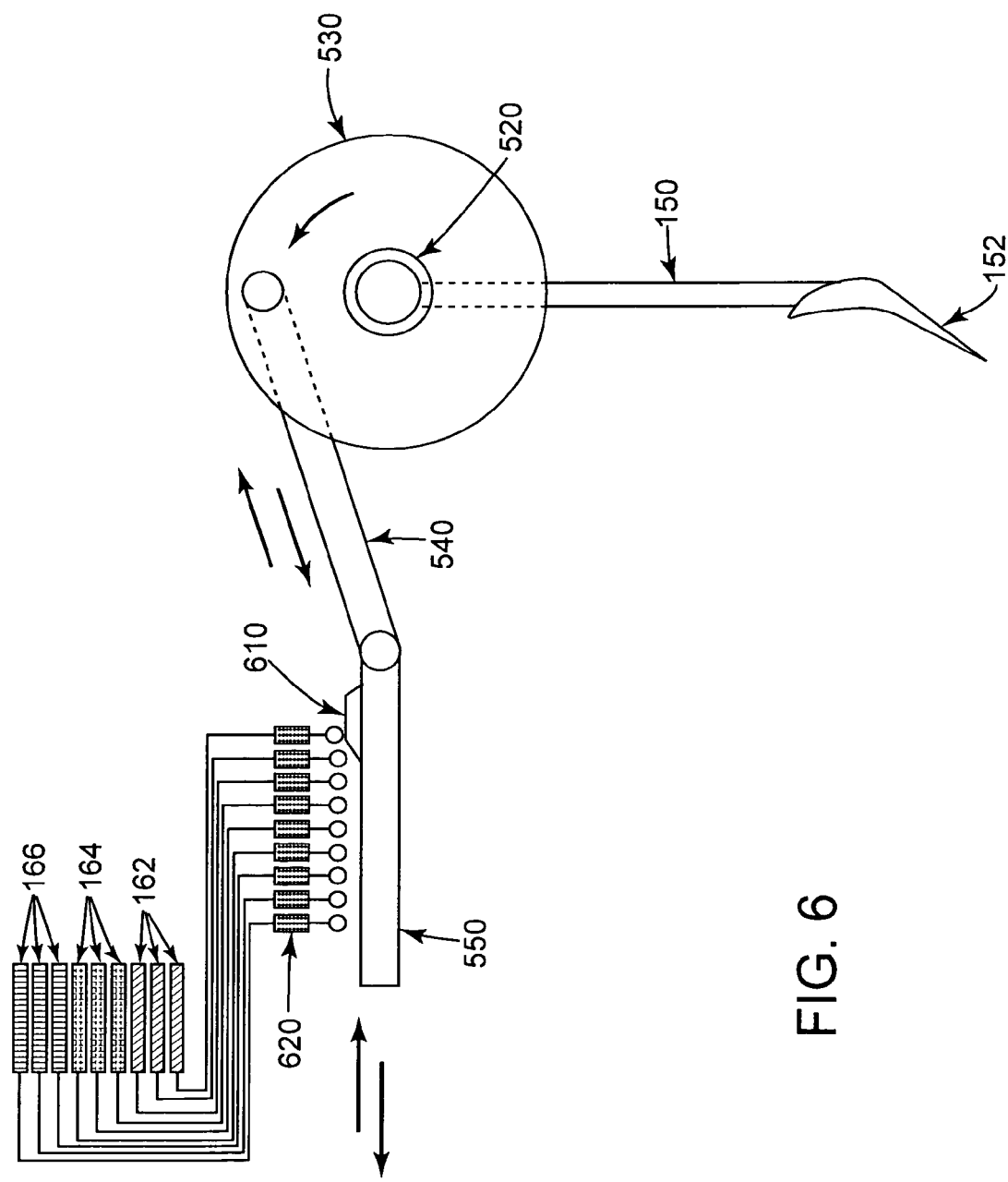
FIG. 6 is a schematic diagram of another embodiment showing an interconnection between the airfoil and the switches that control the lights of the wind speed indicator.

FIG. 6 is a schematic diagram of an alternate embodiment of an interconnection between the airfoil 152 and the switches that control the lights 162, 164, 166. In this embodiment, shaft 550 features a cam 610, which activates position switches 620. The activation of particular switches within the array of position switches 620 therefore corresponds to the speed of the wind contacting and lifting airfoil 152, and the switch signals are used to control lights 162, 164 and 166. It will be understood by one of ordinary skill in the art that the switching system can be modified so that the plurality of lights in each different color array are actuated sequentially as the wind speed increases. Thus, if each color array has three separate lights, light wind speeds of 1 to 5 knots will serially illuminate one, two or all three green lights to indicate more accurately the relative wind speed.

Figure 7:
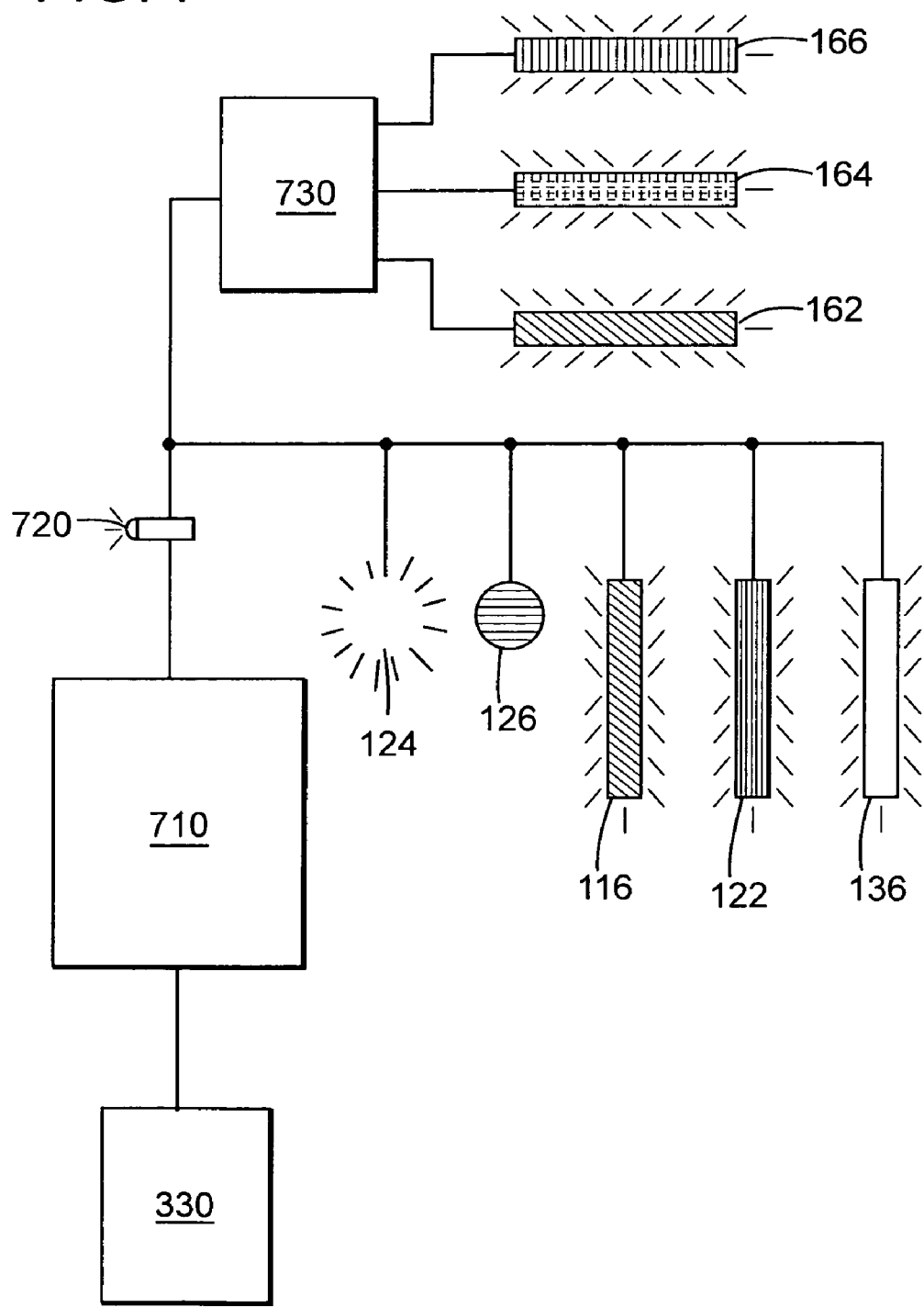
FIG. 7 is a schematic diagram of one embodiment of a power distribution circuit for the illuminated directional wind speed indicator of the invention.

FIG. 7 is a simplified schematic circuit diagram of the LED wind direction and speed indicator for an embodiment incorporating photocells and rechargeable batteries. The photovoltaic arrays 330 are wired to the chargers/batteries 710. In the preferred embodiment, the LEDs are powered when ambient light falls below a predetermined level, e.g., in conditions of fog or a sandstorm, and at dusk. When the photocell 720 or, alternatively, a time clock transmits an appropriate signal, the switch closes and power from the batteries is conducted to the lighting circuits. The lighting circuits include the lights on the rotatable enclosure 110, i.e., red LEDs 122, green LEDs 116, white LED 124 and blue LED 126, and rudder array 136. As discussed above, wind of sufficient force on the airfoil 152 will rotate the lever 150, linking/supporting rod 510 and disc 530, then angular/linear converter link 540 converts the circular motion to a linear motion, sliding shaft 550, and allowing its distal end to activate the light switches of switch array 730, which as discussed earlier can be, for example, an optical electronic switch array or an array of position switches. This leads to the illumination of one or more of the green stage of lights 162 of the vertical bar 160 for low winds, the yellow stage of lights 164 for moderate winds, and the red stage of lights 166 for higher winds.

In the embodiment illustrated in FIGS. 5 and 6, the screen 570 or cam 610 are configured so that less than all of the switches of the switch array will be activated at any one time, so that, for example, at high wind speeds the switches corresponding to the red stage of lights 166 are illuminated, but not the yellow or green stages 164 or 162. However, in an alternate and preferred embodiment, relays may be used so that when the yellow stage of lights 164 is illuminated, the green stage of lights 162 are also illuminated, and so that when the red stage of lights 166 is illuminated, both the green stage of lights 162 and the yellow stage of lights 164 is illuminated. In yet another alternate and preferred embodiment, the length and position of the screen 570 or cam 610 can be modified so as to activate the switches corresponding to the wind speed and to also maintain activation of the switches corresponding to lower wind speeds, allowing for multiple stages of lights to be illuminated without the need for relay logic.

Other types of wind speed indicators and associated electrical circuitry can be employed. A rotating cup anemometer can be substituted and mounted on the base. However, the embodiment described above is of simple and robust construction requiring little maintenance and has the ability to withstand the harsh conditions that are foreseeable in desert installations.

The openings in the housing through which the wind speed assembly passes can be provided with appropriate seals (not shown) that are well known to those of ordinary skill in the art. Dust and water vapor seals will preserve the mechanical linkages and electrical contacts from damage. Various integrated circuit devices and processors can also be substituted for mechanical components. Piezo-electric pressure sensing devices can also be employed in conjunction with the wind speed indicator to simplify the mechanical assembly. Other known types of anemometers can be employed using analog or digital signals to actuate the circuits connected to the vertical wind speed indicator lighting array.

It will also be understood that observers such as aircraft pilots and navigators, as well as ground personnel and installation employees who will be called upon to rely on the indicating apparatus of the invention will require training in the arrangement and meaning of the various lighting arrays and the significance of the colors and color combinations that are viewed. To this end, illustrative training materials illustrating the specific configuration of the apparatus of the invention will be provided, as well as the position of the variously colored light sources. Existing standards for placement of colored navigational lights, e.g., the United States Federal Aviation Agency can also be employed.

The present invention has been described in the foregoing specification with reference to specific embodiments. It will, however, be evident to one of ordinary skill in the art that various modifications and additions can be made without departing from the broader scope of the invention, which is to be determined by reference to the claims that follow. The specification and drawings are, accordingly, to be regarded in an illustrative rather than a restrictive sense.

What is claimed is:

1. An apparatus for indicating wind direction and speed, comprising:
    a. a generally circular base member mounted for rotation in a generally horizontal plane;
    b. a vertical rudder secured to the base member, adjacent to one point on the perimeter, wherein the mounting location of the rudder and a point at the opposite end of the circular base define a front-rear axis of the circular base, with the rudder mounted at the rear, the axis bisecting the circular base into a left side and a right side;
    c. a first plurality of fixed light sources forming a predetermined array of color combinations, mounted on the periphery of the base member, with the color combinations arranged in relation to the rudder, whereby the force of the wind upon the rudder causes the base member to rotate to assume an orientation facing into the wind and thereby to position the light sources to provide a visual indicia of wind direction,
    wherein the first plurality of light sources includes a first and a second subset of light sources, the first subset displaying a first color being mounted on the perimeter of the left half of the circular base, and the second subset displaying a second color being mounted on the perimeter of the right half of the circular base; and
    d. an anemometer device including:
        a lever having a pivot end and a distal end, the pivot end rotatably attached to the base member for movement of the distal end in the vertical plane;
        an airfoil positioned on the distal end, and moveable in the vertical plane in response to the changes in wind pressure on the airfoil; and
        a second plurality of light sources positioned in a vertical array above the base member and in electromechanical communication with the position of the airfoil, wherein a predetermined set of light sources are illuminated in response to the position of the airfoil.

2. The apparatus according to claim 1, in which the anemometer device further comprises:
    a. a shaft projecting from the pivot end on generally opposite side of the distal end, the shaft provided inside a recess of the base member;
    b. a plurality of deflection sensors provided in the recess of the base member, each of the deflection sensors being associated with, and electronically responsive to the displacement of the shaft;
    c. a plurality of switches provided in the recess, each of the switches being associated with, and electronically responsive to each of the sensors; and
    d. each of the second plurality of light sources being associated with and coupled to one of the plurality of switches to provide indicia of an output signal associated with a distinctive predetermined wind pressure, wherein a corresponding switch is triggered in response to receiving an output signal from a corresponding sensor.

3. The apparatus according to claim 1, the first plurality of light sources further including:
    a. a front end illuminable device; and
    b. a back end illuminable device, wherein the front end and the back end light sources are positioned between the first subset and the second subset of light sources respectively, each of the front end and the back end light sources emitting a color distinct from the colors of the first and second subsets of light sources.

4. The apparatus according to claim 3, the apparatus further comprising a third plurality of light sources defining a directional symbol having a head portion and a tail portion and arranged on at least one of a side surface of the rudder.

5. The apparatus according to claim 4, in which the first color, the second color, color of the front end illuminable device, and color of the back end illuminable device are red, green, white and blue respectively.

6. The apparatus according to claim 2, in which the second plurality of light sources transmits, in response to the displacement of the airfoil, a series of colors including green, yellow and red to indicate a visual signal code of stages defining low, moderate and high wind speed to a user.

7. The apparatus according to claim 1, in which the top surface of the base member is adapted to receive a solar power collector and the recess is adapted to receive a battery coupled to the solar power collector, the battery being configured to collect solar power and deliver power to any illuminable device of the first and second plurality of light sources.

8. The apparatus according to claim 1, in which at least one of the first and second plurality of light sources is selected from a group consisting of light emitting diodes (LEDs), optical cables, gel cables, fluorescent bulbs, incandescent bulbs, halogen bulbs and xenon lamps.

9. The apparatus according to claim 3, in which the first, second plurality of light sources, front, and back end light sources illuminate colors in accordance with the anti-collision navigation lighting system codes of the Federal Aviation Regulation.

10. A system for indicating wind speed and direction through an illuminable device which comprises:
   a. a vertical shaft;
   b. a member rotatably mounted to the shaft in a horizontal plane, the member being asymmetrical in shape and having uniform distribution of mass about the vertical shaft, the member including a vertical portion coupled to the member and responsive to external forces to cause the member to rotate about the shaft;
   c. a first and a second plurality of light sources positioned generally on the opposite outer peripheral segments of the member, wherein the first plurality of light sources illuminates a first color distinct from a second color illuminated by the second plurality of light sources, the first color juxtaposed adjacent the second color to define a combination of colors that transmits a visual signal code to a user;
   d. a lever having a pivot end, a distal end, and a shaft projecting from the pivot end on generally opposite side of the distal end and within a recess of the member, the pivot end movably attached to the bottom surface of the mounted member for moving the distal end of the lever from a vertical position to a horizontal position;
   e. an airfoil positioned on the distal end, the airfoil moving from the vertical position to the horizontal position in response to the changes in wind pressure on the airfoil;
   f. a plurality of deflection sensors provided in the recess of the member, each of the deflection sensors being associated with, and electronically responsive to the displacement of the shaft;
   g. a plurality of switches provided in the recess, each of the switches being associated with, and electronically responsive to each of the sensors;
   h. a vertical bar projecting from the top surface of the member; and
   i. a third plurality of light sources positioned on the vertical bar and defining an array of beacon lights, each of the fourth plurality of lights being associated with and coupled to one of the plurality of switches to provide visual indicia of an output signal associated with a distinctive predetermined change in wind velocity, wherein a corresponding switch is triggered in response to receiving an output signal from a corresponding sensor for illuminating a predetermined set of light sources in response to the change in wind velocity to a user on the ground or in the air.

11. The system according to claim 10, further including a fourth plurality of light sources having a head portion and tail portion generally positioned on top of the horizontally mounted member for visually defining a wind directional symbol in conjunction with the visual signal code provided by the juxtaposed combination of colors to facilitate a system for indicating wind direction to a user on the ground or in the air.

12. The system according to claim 10, in which the top surface of the member is adapted to receive a solar power collector and the recess is adapted to receive a battery coupled to the solar power collector, the battery being configured to collect solar power and deliver power to any illuminable device of the first, second, third, and fourth plurality of light sources.

13. The system according to claim 10, further including:
   a. a front end illuminable device; and
   b. a back end illuminable device, wherein the front end illuminable device and the back end illuminable device are positioned between the first plurality and the second plurality of light sources, each of the front end illuminable device and the back end illuminable device emitting a color distinct from other illuminating colors on the apparatus.

14. A ground wind direction indicator comprising:
   a light-supporting member mounted for rotation in a horizontal plane proximate the earth's surface, the light supporting member having a forward portion and an aft portion with opposing right and left flanking portions extending between the forward and aft portions,
   a vertically mounted generally planar wind vane member attached to the light-supporting member,
   a first plurality of contiguous, directionally-oriented light sources of predetermined contrasting colors arranged in a generally horizontal plane on the light supporting member,
   the first plurality of light sources including a headwind indicator in the forward portion and an opposing tailwind indicator in the aft portion, the indicators aligned, respectively, with the leading edge and trailing edge of the vane member, and also including a first and second subset of light sources extending from the headwind indicator and tailwind indicator, and positioned in the right and left flanking portions of the light-supporting member,
   a second plurality of light sources mounted on the perimeter of the wind vane; and
   a wind speed indicator that includes a third plurality of omni-directional light sources electrically connected to one or more switches and extending in a vertical array from the light-supporting member.

\* \* \* \* \*

UNITED STATES PATENT AND TRADEMARK OFFICE
CERTIFICATE OF CORRECTION

PATENT NO. : 8,091,420 B2  
APPLICATION NO. : 12/661546  
DATED : January 10, 2012  
INVENTOR(S) : Al Wehebi Page 1 of 1

It is certified that error appears in the above-identified patent and that said Letters Patent is hereby corrected as shown below:

Claim 10, Column 9, Line 54, correct "fourth plurality of lights" to "third plurality of light sources".

Claim 12, Column 10, Line 13, correct "claim 10" to "claim 11".

Signed and Sealed this  
Twelfth Day of February, 2013

Teresa Stanek Rea  
*Acting Director of the United States Patent and Trademark Office*